(12) United States Patent  (10) Patent No.: US 12,484,006 B2
Mao                       (45) Date of Patent:     Nov. 25, 2025

(54) VoWiFi REGISTRATION CONTROL METHOD AND APPARATUS, ELECTRONIC DEVICE, AND SERVER (71) Applicant: VIVO MOBILE COMMUNICATION CO., LTD., Dongguan (CN)

(72) Inventor: Yuanze Mao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 472 days.

(21) Appl. No.: 18/098,676

(22) Filed: Jan. 18, 2023

(65) Prior Publication Data

US 2023/0269692 A1    Aug. 24, 2023

Related U.S. Application Data (63) Continuation of application No. PCT/CN2021/107281, filed on Jul. 20, 2021.

(51) Int. Cl.
  H04W 60/04   (2009.01)
  H04L 65/1016 (2022.01)
  H04L 65/1073 (2022.01)
  H04W 8/26    (2009.01)
  H04W 64/00   (2009.01)

(52) U.S. Cl.
  CPC ......... *H04W 60/04* (2013.01); *H04L 65/1016* (2013.01); *H04L 65/1073* (2013.01); *H04W 8/26* (2013.01); *H04W 64/003* (2013.01)

(58) Field of Classification Search
  CPC ..... H04W 60/04; H04W 8/26; H04W 64/003; H04L 65/1016; H04L 65/1073
  See application file for complete search history.

(56) References Cited

U.S. PATENT DOCUMENTS

2016/0262005 A1*  9/2016  Sridhar ............... H04W 76/15
2020/0037281 A1   1/2020  Lee et al.

FOREIGN PATENT DOCUMENTS

CN     105916115 A     8/2016
CN     107734491 A     2/2018
CN     108769915 A    11/2018

OTHER PUBLICATIONS

Extended European Search Report issued in related European Application No. 21845869.3, mailed Dec. 5, 2023, 11 pages.
International Search Report issued in corresponding International Application No. PCT/CN2021/107281, mailed Oct. 26, 2021, 4 pages.
First Office Action issued in related Chinese Application No. 202010710548.0, mailed Mar. 25, 2022, 7 pages.
Second Office Action issued in related Chinese Application No. 202010710548.0, mailed Nov. 3, 2022, 6 pages.

* cited by examiner

*Primary Examiner* — Justin Y Lee
(74) *Attorney, Agent, or Firm* — IPX PLLC (57) ABSTRACT

A VoWiFi registration control method and apparatus, an electronic device, and a server, are provided. A method on an electronic device side includes: obtaining first feature information of an electronic device; and controlling, in a case that the first feature information does not match second feature information, termination of VoWiFi registration in a process of performing VoWiFi registration. The first feature information is position feature information determined based on a first position of the electronic device, and the second feature information is position feature information determined based on a second position of the electronic device.

9 Claims, 6 Drawing Sheets

VoWiFi REGISTRATION CONTROL METHOD AND APPARATUS, ELECTRONIC DEVICE, AND SERVER

CROSS-REFERENCE TO RELATED APPLICATIONS

This application is a continuation of International Application No. PCT/CN2021/107281, filed on Jul. 20, 2021, which claims the priority of Chinese Patent Application No. 202010710548.0, filed on Jul. 22, 2020. The entire contents of each of the above-identified applications are expressly incorporated herein by reference.

TECHNICAL FIELD

This application belongs to the field of communication technologies, and in particular, to a VoWiFi registration control method and apparatus, an electronic device, and a server.

BACKGROUND

With the development of Internet technology, the technology of Voice over Wireless-Fidelity (VoWiFi) is rising gradually. VoWiFi is a technology through which Wireless-Fidelity (Wi-Fi) is used as an access network to access an IP Multimedia Subsystem (IMS) of an operator for a voice call or video call. When detecting a WIFI network, an electronic device first accesses a Wi-Fi network. If accessing successfully, the electronic device authenticates through the Wi-Fi network, and then registers with an IMS network of a mobile operator. If the registration is successful, a terminal may perform a VoWiFi service through Wi-Fi and an IMS on a network side.

However, in a case that the electronic device is in a roaming environment, there is a charging loophole in a network layout of the VoWiFi by the operator, which easily leads to a charging dispute.

SUMMARY

Embodiments of this application provide a VoWiFi registration control method and apparatus, an electronic device, and a server.

According to a first aspect, the embodiments of this application provide a VoWiFi registration control method, applied to an electronic device. The method includes:
obtaining first feature information of an electronic device; and
controlling, in a case that the first feature information does not match second feature information, termination of VoWiFi registration in a process of performing VoWiFi registration,
where the first feature information is position feature information determined based on a first position of the electronic device, and
the second feature information is position feature information determined based on a second position of the electronic device.

According to a second aspect, the embodiments of this application further provide a VoWiFi registration control method, applied to a server. The method includes:
receiving first feature information sent by an electronic device;
obtaining second feature information of the electronic device;
comparing the first feature information with the second feature information to obtain a comparison result; and
sending a response message to the electronic device according to the comparison result,
where the first feature information is position feature information determined based on a first position of the electronic device, and
the second feature information is position feature information determined based on a second position of the electronic device.

According to a third aspect, the embodiments of this application further provide a VoWiFi registration control apparatus, applied to an electronic device. The apparatus includes:
a first obtaining module, configured to obtain first feature information of an electronic device; and
a termination module, configured to control, in a case that the first feature information does not match second feature information, termination of VoWiFi registration in a process of performing VoWiFi registration;
where the first feature information is position feature information determined based on a first position of the electronic device, and
the second feature information is position feature information determined based on a second position of the electronic device.

According to a fourth aspect, the embodiments of this application further provide a VoWiFi registration control apparatus, applied to a server. The apparatus includes:
a receiving module, configured to receive first feature information sent by an electronic device;
a second obtaining module, configured to obtain second feature information of the electronic device;
a comparison module, configured to compare the first feature information with the second feature information to obtain a comparison result; and
a sending module, configured to send a response message to the electronic device according to the comparison result,
where the first feature information is position feature information determined based on a first position of the electronic device, and
the second feature information is position feature information determined based on a second position of the electronic device.

According to a fifth aspect, the embodiments of this application provide an electronic device. The electronic device includes a processor, a memory, and a program or an instruction stored in the memory and executable on the processor, the program or instruction, when executed by the processor, implementing steps of the method according to the first aspect.

According to a sixth aspect, the embodiments of this application provide a server. The server includes a processor, a memory, and a program or an instruction stored on the memory and executable on the processor, the program or instruction, when executed by the processor, implementing steps of the method according to the second aspect.

According to a seventh aspect, the embodiments of this application provide a readable storage medium. The readable storage medium stores a program or an instruction, the program or instruction, when executed by a processor, implementing steps of the method according to the first aspect or the second aspect.

According to an eighth aspect, the embodiments of this application provide a chip. The chip includes a processor and a communication interface, the communication interface being coupled to the processor, and the processor being configured to run a program or an instruction to implement the method according to the first aspect or the second aspect.

According to a ninth aspect, the embodiments of this application provide a computer software product. The computer software product is stored in a non-volatile storage medium, the software product being configured to be executed by at least one processor to implement steps of the method according to the first aspect or the second aspect.

According to a tenth aspect, the embodiments of this application provide an electronic device. The electronic device is configured to perform the method according to the first aspect.

According to an eleventh aspect, the embodiments of this application provide a server. The server is configured to perform the method according to the second aspect.

DETAILED DESCRIPTION

The following describes the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms such as "first" and "second" in the specification and the claims of this application are intended to distinguish between similar objects, but are not used for describing a specific sequence or a chronological order. It is to be understood that the data termed in such a way is interchangeable in proper circumstances, so that the embodiments of this application can be implemented in other sequences than the sequence illustrated or described herein. In addition, "and/or" in the specification and claims represents at least one of connected objects. The character "/" generally indicates an "or" relationship between the associated objects.

The following describes a VoWiFi registration control method provided in the embodiments of this application in detail through specific embodiments and application scenarios thereof with reference to the accompanying drawings.

When an electronic device needs to perform VoWiFi registration from one region to another roaming region, the electronic device can match and verify information in a registration process, thus implementing registration control for VoWiFi. The VoWiFi registration control method can be implemented based on the electronic device and a server together, or only based on the electronic device.

For a first case, when the VoWiFi is registered, the electronic device can locate in real time to obtain position information, and send country code information corresponding to the position information and information about a SIM card in the electronic device to the server. Based on the received information, the server compares the information with information preset by a network. If the information matches, an authentication message is sent to the electronic device, so that the electronic device continues to register. If the information does not match, a prohibition message is sent to the electronic device, so that the electronic device terminates a VoWiFi registration process.

For a second case, the electronic device can implement registration control for VoWiFi on an electronic device side. When registering the VoWiFi, the electronic device can locate in real time to obtain position information and obtain country code information corresponding to the position information. In addition, the electronic device can obtain country code information corresponding to a SIM card in the electronic device. The electronic device compares the country code information corresponding to the position information with the country code information corresponding to the SIM card. If the country code information matches, registration can be continued. If the country code information does not match, a registration process of VoWiFi can be terminated.

The VoWiFi registration control method is described in detail from the electronic device side and a server side respectively.

Figure 1:
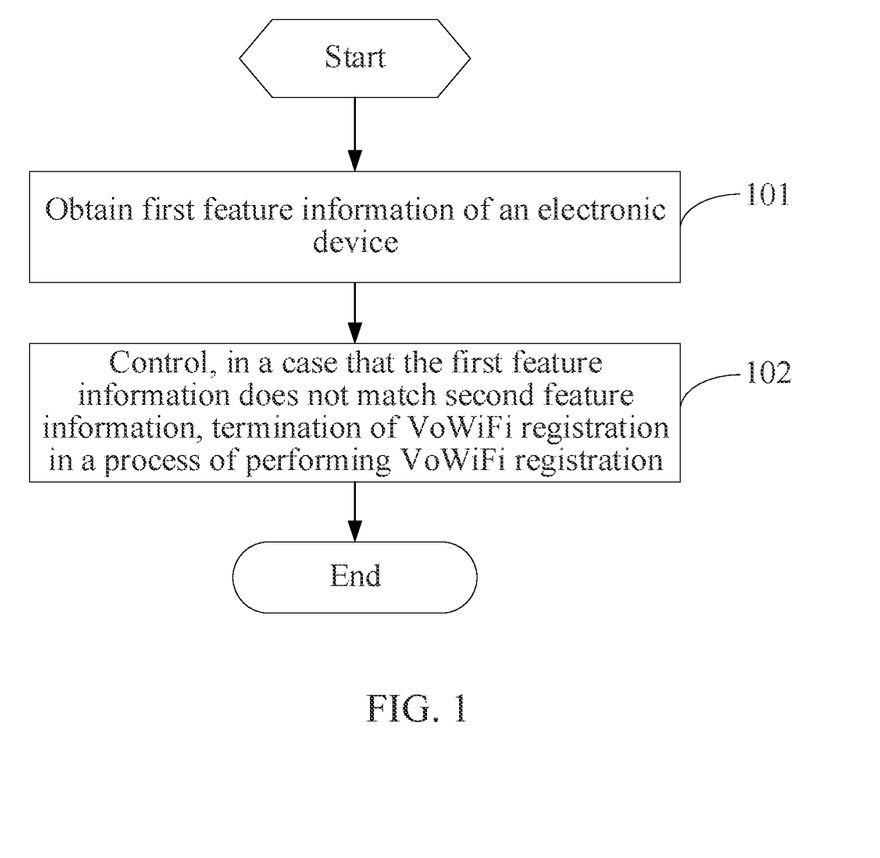
FIG. 1 is a flowchart of a VoWiFi registration control method on an electronic device side according to an embodiment of this application.

A VoWiFi registration control method corresponding to the electronic device side is referred to FIG. 1. FIG. 1 is a flowchart of a VoWiFi registration control method according to an embodiment of this application. The method is applied to an electronic device, as shown in FIG. 1, and includes the following steps:

Step 101. Obtain first feature information of an electronic device.

The first feature information is position feature information determined based on a first position of the electronic device.

In this step, first feature information of the electronic device associated with the first position can be obtained. The feature information may be feature information for reflecting the first position.

Step 102. Control, in a case that the first feature information does not match second feature information, termination of VoWiFi registration in a process of performing VoWiFi registration.

The second feature information is position feature information determined based on a second position of the electronic device.

In this step, second feature information of the electronic device associated with the second position can be obtained. The feature information may be feature information for reflecting the second position.

The first feature information and the second feature information include, for example, a country code of a position at which the electronic device is located, International Mobile Subscriber Identity (IMSI) information of a Subscriber Identity Module (SIM) card in the electronic device, a Mobile Country Code (MCC) of the SIM card in the electronic device, and the like. For ease of comparison, it should be understood that the first feature information and the second feature information may be information of a same type.

The first feature information and the second feature information may be respectively obtained based on the following methods: obtained by positioning based on a real-time position at which the electronic device is located, obtained based on information of the SIM card in the electronic device, or obtained based on information of a network to which the electronic device is connected.

In the process of performing VoWiFi registration, the first feature information and the second feature information can be compared, and if the first feature information matches the second feature information, a VoWiFi registration process can be continued. In a case that the first feature information does not match the second feature information, VoWiFi registration is controlled to terminate, to prevent the electronic device from generating a charging dispute due to roaming. It should be noted that the electronic device can compare the first feature information with the second feature information, or compare the first feature information with the second feature information through a server by communicating with the server.

In a case that the first feature information does not match the second feature information, the electronic device controls termination of VoWiFi registration, thereby preventing the electronic device from generating a charging dispute in a roaming environment.

In some implementations, the step of controlling, in a case that the first feature information does not match second feature information, termination of VoWiFi registration includes:
  sending the first feature information to a server;
  receiving a response message sent by the server according to the first feature information; and
  controlling, in a case that the response message indicates that the first feature information does not match the second feature information, termination of VoWiFi registration.

In the implementation, the electronic device sends the first feature information to the server, so that the server compares the first feature information with the second feature information, and sends a response message to the electronic device according to a comparison result. In a case that it is determined that the first feature information does not match the second feature information according to the response message, VoWiFi registration is controlled to terminate.

The second feature information may be information preset by the server or information obtained based on a network, and information associated with the second position can be obtained based on the second feature information.

In this way, the second feature information is obtained based on the server. Because the second feature information is associated with the second position, accuracy of obtaining the second position can be improved, and misprocessing on VoWiFi registration can be reduced.

In some implementations, the first feature information includes first position information and first identification information, and the second feature information includes second position information and second identification information. The step of controlling, in a case that the response message indicates that the first feature information does not match the second feature information, termination of VoWiFi registration includes:
  controlling termination of VoWiFi registration in a case that the response message indicates that the first position information does not match the second position information, or the first identification information does not match the second identification information.

In the implementation, the electronic device sends the first position information and the first identification information to the server, and the first position information may be information associated with a position at which the electronic device is located, such as a country code corresponding to the electronic device obtained by positioning. The first identification information may be information for identifying the electronic device, such as MCC information of a SIM card of the electronic device. The second identification information may be MCC information preset by the server, and the second position information may be country code information corresponding to a home network of the electronic device.

After receiving the first position information and the first identification information, the server can compare the first identification information with the preset second identification information, and compare the first position information with the second position information. In addition, after receiving the first position information, a server of a roaming region at which the electronic device is located can further transfer the first position information to a home network server of the electronic device, so that the home network server of the electronic device compares the first position information with the second position information.

In order to facilitate understanding of the foregoing implementations, a specific process of an interaction flow between the electronic device and the server is described below as an example. It should be noted that this example is only one implementation of the embodiments of this application and does not constitute a specific limitation on the implementation.

A positioning module of the electronic device obtains position information of the electronic device in real time, obtains a country code according to the position information, and transmits the country code to a call module. In a case that the positioning module does not obtain the position information, the country code can be set to a preset character and the character is transmitted to the call module. When the electronic device is connected to Wi-Fi, turns on a VoWiFi switch, and initiates VoWiFi registration, the call module sends IMSI information of a SIM card and a registration message of the country code to the server for VoWiFi registration.

After receiving the registration message, the server parses the IMSI information and the country code information, and obtains MCC information from the IMSI information. The server respectively compares the MCC information and country code information with MCC information and country code information preset by a network. A 401 authentication message is sent to the electronic device if comparison results are all the same. If there is a comparison result that is different, a 403 prohibition message is sent to the electronic device.

If receiving the 401 authentication message sent by the server, the electronic device can continue a VoWiFi registration process. If receiving the 403 prohibition message sent by the server, the electronic device controls termination of the VoWiFi registration process.

In this implementation, whether to control termination of VoWiFi registration can be determined by comparing a plurality of groups of information, which can improve operation flexibility.

In some implementations, the step of obtaining first feature information of the electronic device includes:

obtaining a current position of the electronic device and obtaining first feature information corresponding to the position in a case that the electronic device is in a data connecting state, or obtaining a current position of the electronic device and obtaining first feature information corresponding to the position in a case that the electronic device is not in a data connecting state, and the electronic device is in a preset condition.

In this implementation, a current position of the electronic device can be obtained through two methods.

According to a method, in a case that the electronic device is in the data connecting state, the current position of the electronic device can be obtained based on real-time positioning by the positioning module of the electronic device.

According to another method, in a case that the electronic device is not in the data connecting state, such as in an airplane mode, when the electronic device switches from one area to another, the Mobile Network Code (MNC) or MCC does not change, and it is necessary to assist to trigger the positioning module to switch a positioning strategy according to the preset condition. When the electronic device is in the preset condition, the positioning module of the electronic device is triggered to obtain a position of the electronic device. The preset condition is a case that, for example, Wi-Fi is disconnected, a card is plugged or unplugged, a machine is restarted, an offline mode (airplane mode) is enabled or disabled, a positioning switch is turned on or off, and the like.

After the current position of the electronic device is obtained, first feature information associated with the position may be obtained based on the position.

In this way, the electronic device can be positioned in a case that the electronic device is in different data connecting states, so that reliability of positioning information can be improved.

In some implementations, the step of controlling, in a case that the first feature information does not match second feature information, termination of VoWiFi registration includes:

comparing the first feature information with the second feature information; and controlling, in a case that the first feature information does not match the second feature information, termination of VoWiFi registration.

In this implementation, the electronic device can control registration of the VoWiFi at an electronic device end.

In some implementations, the electronic device can obtain the first feature information and the second feature information, for example, the electronic device respectively obtains country code information corresponding to the SIM card of the electronic device and country code information of the position of the electronic device. In a case that the first feature information matches the second feature information, the electronic device can continue the VoWiFi registration process. In a case that the first feature information does not match the second feature information, the electronic device controls termination of VoWiFi registration, so as to control roaming registration.

In order to facilitate understanding of the implementation, the following examples are described with reference to specific implementations. It should be noted that the example is only an implementation and does not constitute a specific limitation on the implementation.

A call module of the electronic device obtains MCC information of the SIM card according to the IMSI information of the SIM card, and obtains country code information corresponding to the SIM card according to the MCC information.

The positioning module of the electronic device enables positioning, obtains the position information of the electronic device in real time, and obtains country code information of the current position according to the position information. If the positioning module does not obtain the position information, the country code information can be set as a preset character.

The electronic device is connected to Wi-Fi and turns on the VoWiFi switch to initiate VoWiFi registration. In a registration process, the call module of the electronic device compares the country code information corresponding to the SIM card with the country code information of the position of the electronic device. If the two pieces of information are the same, VoWiFi registration is continued. If the two pieces of information are different, the VoWiFi registration process is controlled to terminate.

In this way, the electronic device can control VoWiFi registration through information comparison, which can improve flexibility and efficiency for controlling VoWiFi registration.

Figure 2:
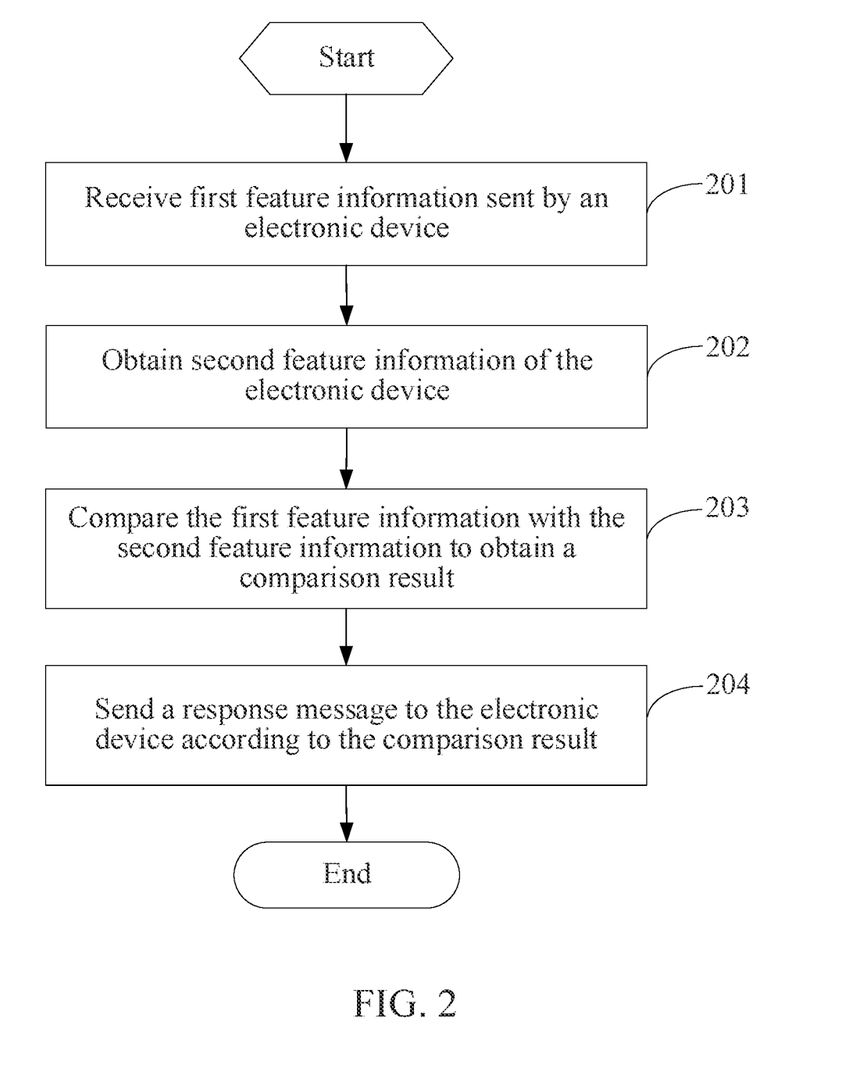
FIG. 2 is a flowchart of a VoWiFi registration control method on a server side according to an embodiment of this application.

Referring to FIG. 2 for a VoWiFi registration control method corresponding to a server side, FIG. 2 is a flowchart of a VoWiFi registration control method according to an embodiment of this application. As shown in FIG. 2, the VoWiFi registration control method includes the following steps:

Step 201. Receive first feature information sent by an electronic device.

The first feature information is position feature information determined based on a first position of the electronic device.

Step 202. Obtain second feature information of the electronic device.

The second feature information is position feature information determined based on a second position of the electronic device. Explanation of the first feature information and the second feature information may be referred to the description on the electronic device side and details are not repeated herein.

Step 203. Compare the first feature information with the second feature information to obtain a comparison result.

After receiving the first feature information, the server compares the first feature information with the second feature information. The server may be a server corresponding to an operator of a roaming place or a server corresponding to a home place of the SIM card of the electronic device.

Step 204. Send a response message to the electronic device according to the comparison result.

After obtaining the comparison result, the server sends the response message to the electronic device, and the response message includes the comparison result.

For example, when the comparison result is that the information matches, the server sends a first response message to the electronic device. When the comparison result is that the information does not match, the server sends a second response message to the electronic device. In this way, when receiving the response message, the electronic device can obtain the comparison result according to the received different response messages. Alternatively, the server may send a response message including the comparison result to the electronic device. After receiving the response message, the electronic device can parse the response message to obtain a comparison result, and control termination of VoWiFi registration in a case that the comparison result indicates that the first feature information does not match the second feature information.

The electronic device can perform registration control based on the comparison result obtained by comparing the first feature information and the second feature information by the server, which can improve accuracy of the comparison result and flexibility of the registration control.

In some implementations, the first feature information includes first position information and first identification information, and the second feature information includes second position information and second identification information. The step of comparing the first feature information with the second feature information to obtain a comparison result includes:

comparing the first position information with the second position information to obtain a first comparison result; and comparing the first identification information with the second identification information to obtain a second comparison result.

The step of sending a response message to the electronic device according to the comparison result includes.

sending the response message to the electronic device according to the first comparison result and the second comparison result.

In the implementation, the first position information may be information associated with a position at which the electronic device is located, such as a country code corresponding to the electronic device obtained by positioning. The second position information may be country code information corresponding to a home network of the electronic device. The first identification information may be information for identifying the electronic device, such as MCC information of a SIM card of the electronic device. The second identification information may be MCC information preset by the server.

The response message sent by the server to the electronic device includes the first comparison result and the second comparison result, and the electronic device controls termination of VoWiFi registration when the first comparison result indicates that the first position information does not match the second position information, or when the second comparison result indicates that the first identification information does not match the second identification information.

In this implementation, whether to control termination of VoWiFi registration can be determined by comparing a plurality of groups of information, which can improve operation flexibility.

According to the embodiments of this application, VoWiFi registration is controlled to terminate through information comparing during roaming, to implement flexible control for VoWiFi roaming, thereby meeting a requirement of an operator and making up for a safety problem and an abnormal SIM card charge problem caused by the existing network defect of the operator. The embodiments of this application can further be applied to scenarios in which there is a network safety problem of the operator during roaming, for example, Long Term Evolution (LTE), Global System for Mobile communications (GSM), Code Division Multiple Access (CDMA), and the like.

It needs to be noted that, in the VoWiFi registration control method according to the embodiments of this application, an execution body may be a VoWiFi registration control apparatus, or a control module in the VoWiFi registration control apparatus configured to perform and load the VoWiFi registration control method. In the embodiments of this application, an example in which the VoWiFi registration control apparatus performs and loads the VoWiFi registration control method is used for describing the VoWiFi registration control method according to the embodiments of this application.

Figure 3:
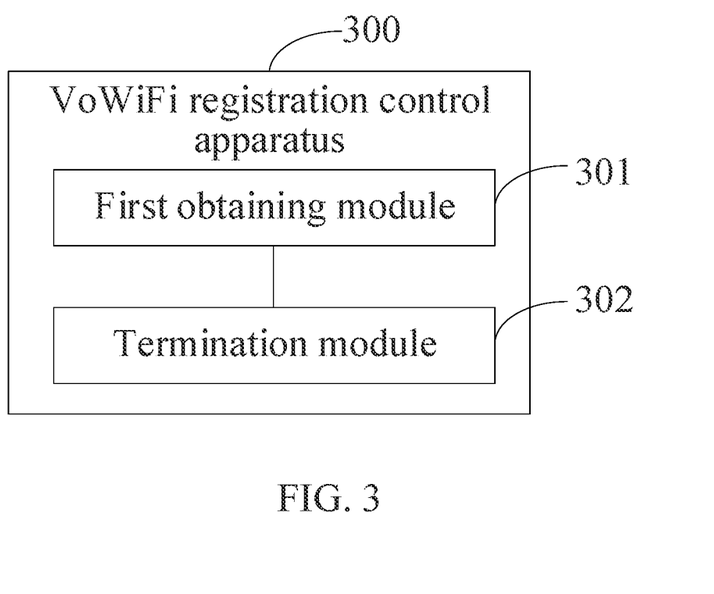
FIG. 3 is a first structural diagram of a VoWiFi registration control apparatus according to an embodiment of this application.

FIG. 3 is a structural diagram of a VoWiFi registration control apparatus according to an embodiment of this application. The apparatus is applied to an electronic device. As shown in FIG. 3, a VoWiFi registration control apparatus 300 includes:

a first obtaining module 301, configured to obtain first feature information of an electronic device; and a termination module 302, configured to control, in a case that the first feature information does not match second feature information, termination of VoWiFi registration in a process of performing VoWiFi registration;

where the first feature information is position feature information determined based on a first position of the electronic device, and the second feature information is position feature information determined based on a second position of the electronic device.

In some implementations, the termination module includes:

a sending submodule, configured to send the first feature information to a server;

a receiving submodule, configured to receive a response message sent by the server according to the first feature information; and a first termination submodule, configured to control, in a case that the response message indicates that the first feature information does not match the second feature information, termination of VoWiFi registration.

In some implementations, the first feature information includes first position information and first identification information, and the second feature information includes second position information and second identification information. The first termination submodule is configured to:

control termination of VoWiFi registration in a case that the response message indicates that the first position information does not match the second position information, or the first identification information does not match the second identification information.

In some implementations, the first obtaining module includes:

a first obtaining submodule, configured to obtain a current position of the electronic device and obtain first feature information corresponding to the position in a case that the electronic device is in a data connecting state; or a second obtaining submodule, configured to obtain a current position of the electronic device and obtain first feature information corresponding to the position in a case that the electronic device is not in a data connecting state, and the electronic device is in a preset condition.

In some implementations, the termination module includes:

a first comparison submodule, configured to compare the first feature information with the second feature information; and a second termination submodule, configured to control, in a case that the first feature information does not match the second feature information, termination of VoWiFi registration.

The VoWiFi registration control apparatus 300 can implement processes implemented by the electronic device in the foregoing method embodiments and achieve the same beneficial effects. To avoid repetition, details are not described herein again.

The VoWiFi registration control apparatus in the embodiments of this application may be an apparatus, or a component, an integrated circuit, or a chip in a terminal. The apparatus may be a mobile electronic device or a non-mobile electronic device. For example, the mobile electronic device may be a mobile phone, a tablet computer, a laptop computer, a palmtop computer, an in-vehicle electronic device, a wearable device, an Ultra-Mobile Personal Computer (UMPC), a netbook, or a Personal Digital Assistant (PDA). The non-mobile electronic device may be a Network Attached Storage (NAS), a personal computer, a television, an automated teller machine, or a self-service machine. This is not specifically limited in the embodiments of this application.

The VoWiFi registration control apparatus in the embodiments of this application may be an apparatus with an operating system. The operating system may be an Android operating system, or may be an iOS operating system or other possible operating systems, which is not specifically limited in the embodiments of this application.

The VoWiFi registration control apparatus according to the embodiments of this application can implement processes implemented by the electronic device in the method embodiment corresponding to FIG. 1. To avoid repetition, details are not described herein again.

In the embodiments of this application, in a case that the first feature information does not match the second feature information, the electronic device controls termination of VoWiFi registration, thereby preventing the electronic device from generating a charging dispute in a roaming environment.

In some implementations, the embodiments of this application further provide an electronic device. The electronic device includes a processor, a memory, and a program or an instruction stored in the memory and executable on the processor. When the program or instruction is executed by the processor, processes of the foregoing embodiments of the VoWiFi registration control method on the electronic device side are implemented, and a same technical effect can be achieved. To avoid repetition, details are not described herein again.

It should be noted that the electronic device in the embodiments of this application may be the foregoing mobile electronic device and non-mobile electronic device.

Figure 4:
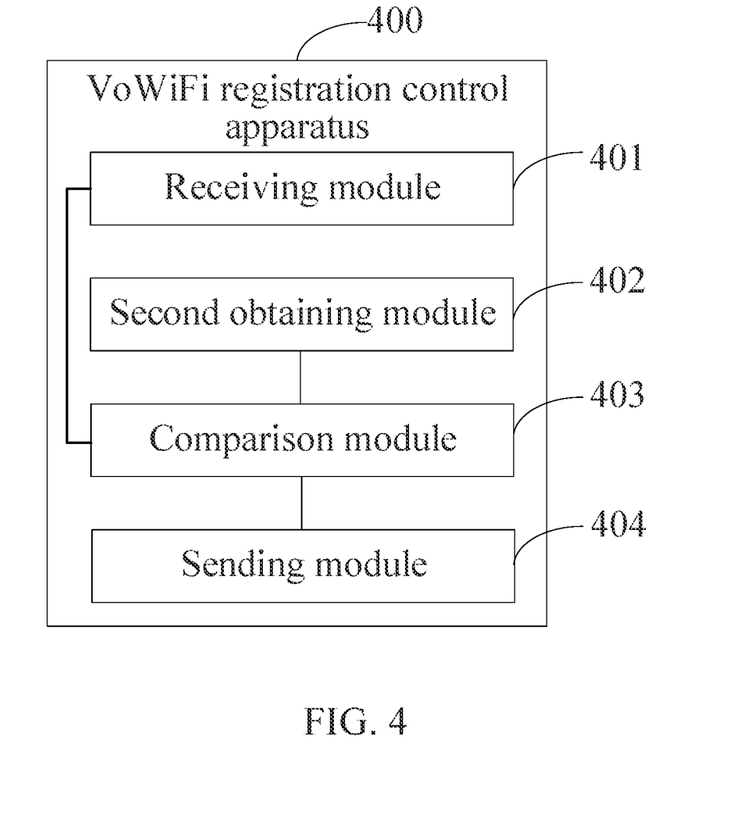
FIG. 4 is a second structural diagram of a VoWiFi registration control apparatus according to an embodiment of this application.

FIG. 4 is a structural diagram of another VoWiFi registration control apparatus according to an embodiment of this application. The apparatus is applied to a server. As shown in FIG. 4, a VoWiFi registration control apparatus 400 includes:
- a receiving module 401, configured to receive first feature information sent by an electronic device;
- a second obtaining module 402, configured to obtain second feature information of the electronic device;
- a comparison module 403, configured to compare the first feature information with the second feature information to obtain a comparison result; and
- a sending module 404, configured to send a response message to the electronic device according to the comparison result,
- where the first feature information is position feature information determined based on a first position of the electronic device, and the second feature information is position feature information determined based on a second position of the electronic device.

In some implementations, the first feature information includes first position information and first identification information, and the second feature information includes second position information and second identification information. The comparison module includes:
- a second comparison submodule, configured to compare the first position information with the second position information to obtain a first comparison result; and
- a third comparison submodule, configured to compare the first identification information with the second identification information to obtain a second comparison result; and
- the sending module is further configured to:
- send the response message to the electronic device according to the first comparison result and the second comparison result.

The VoWiFi registration control apparatus 400 can implement processes implemented by the server in the foregoing method embodiments and achieve the same beneficial effects. To avoid repetition, details are not described herein again.

The VoWiFi registration control apparatus in the embodiments of this application may be an apparatus, or a component, an integrated circuit, or a chip in a server. The apparatus may further be a server.

The VoWiFi registration control apparatus in the embodiments of this application may be an apparatus with an operating system. The operating system may be an Android operating system, or may be an iOS operating system or other possible operating systems, which is not specifically limited in the embodiments of this application.

The VoWiFi registration control apparatus according to the embodiments of this application can implement processes implemented by the server in the method embodiment corresponding to FIG. 2. To avoid repetition, details are not described herein again.

In the embodiments of this application, the electronic device can compare the first feature information with the second feature information based on the server, which can improve accuracy of the comparison result and flexibility of the registration control.

In some implementations, the embodiments of this application further provide a server. The server includes a processor, a memory, and a program or an instruction stored in the memory and executable on the processor. When the program or instruction is executed by the processor, processes of the foregoing embodiments of the VoWiFi registration control method on the server side are implemented, and a same technical effect can be achieved. To avoid repetition, details are not described herein again.

Figure 5:
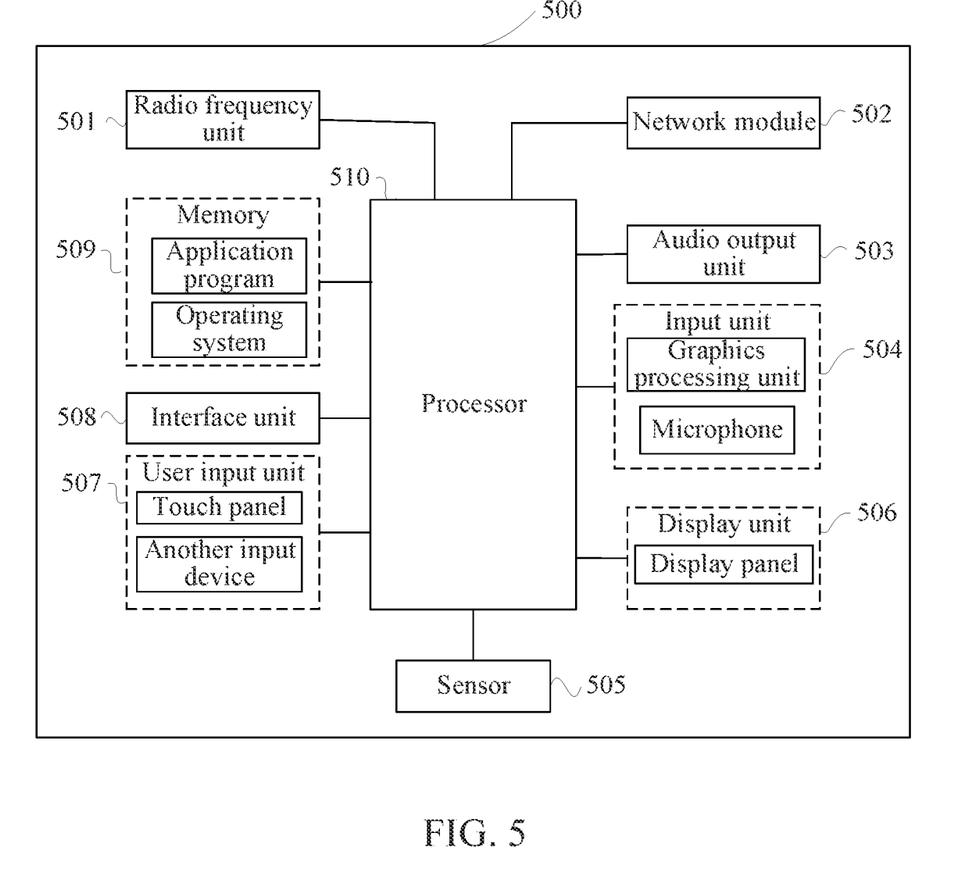
FIG. 5 is a structural diagram of an electronic device according to an embodiment of this application.

FIG. 5 is a schematic diagram of a hardware structure of an electronic device according to an embodiment of this application.

The electronic device 500 includes, but is not limited to: components such as a radio frequency unit 501, a network module 502, an audio output unit 503, an input unit 504, a sensor 505, a display unit 506, a user input unit 507, an interface unit 508, a memory 509, and a processor 510.

Those skilled in the art may understand that the electronic device 500 may further include a power supply (such as a battery) for supplying power to the components. The power supply may be logically connected to the processor 510 by using a power supply management system, thereby implementing functions such as charging, discharging, and power consumption management, by using the power supply management system. The structure of the electronic device shown in FIG. 5 constitutes no limitation on the electronic device, and the electronic device may include more or fewer components than those shown in the figure, or some components may be combined, or a different component deployment may be used. Details are not repeated herein again.

The processor 510 is configured to:
  obtain first feature information of an electronic device; and
  control, in a case that the first feature information does not match second feature information, termination of VoWiFi registration in a process of performing VoWiFi registration,
  where the first feature information is position feature information determined based on a first position of the electronic device, and
  the second feature information is position feature information determined based on a second position of the electronic device.

In some implementations, the processor 510 performs a step of controlling, in a case that the first feature information does not match second feature information, termination of VoWiFi registration, the step including:
  sending the first feature information to a server;
  receiving a response message sent by the server according to the first feature information; and
  controlling, in a case that the response message indicates that the first feature information does not match the second feature information, termination of VoWiFi registration.

In some implementations, the first feature information includes first position information and first identification information, and the second feature information includes second position information and second identification information. The processor 510 performs a step of controlling, in a case that the response message indicates that the first feature information does not match the second feature information, termination of VoWiFi registration, the step including:
  controlling termination of VoWiFi registration in a case that the response message indicates that the first position information does not match the second position information, or the first identification information does not match the second identification information.

In some implementations, the processor 510 performs obtaining first feature information of the electronic device, including:
  obtaining a current position of the electronic device and obtaining first feature information corresponding to the position in a case that the electronic device is in a data connecting state; or
  obtaining a current position of the electronic device and obtaining first feature information corresponding to the position in a case that the electronic device is not in a data connecting state, and the electronic device is in a preset condition.

In some implementations, the processor 510 performs a step of controlling, in a case that the first feature information does not match second feature information, termination of VoWiFi registration, the step including:
  comparing the first feature information with the second feature information; and
  controlling, in a case that the first feature information does not match the second feature information, termination of VoWiFi registration.

The electronic device according to the embodiments of this application can implement processes implemented by the electronic device in the corresponding method embodiments shown in FIG. 1 and achieve the same beneficial effects.

Figure 6:
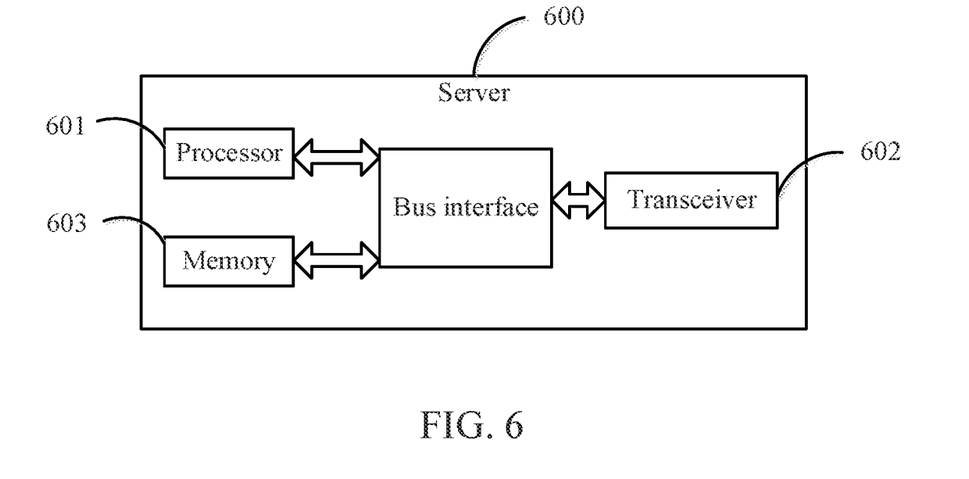
FIG. 6 is a structural diagram of a server according to an embodiment of this application.

FIG. 6 is a structural diagram of a server according to an embodiment of this application. As shown in FIG. 6, a server 600 includes: a processor 601, a transceiver 602, a memory 603, and a bus interface.

The transceiver 602 is configured to: receive first feature information sent by an electronic device.

The processor 601 is configured to: obtain second feature information of the electronic device; and
  compare the first feature information with the second feature information to obtain a comparison result.

The transceiver 602 is further configured to: send a response message to the electronic device according to the comparison result.

The first feature information is position feature information determined based on a first position of the electronic device, and
  the second feature information is position feature information determined based on a second position of the electronic device.

In some implementations, the first feature information includes first position information and first identification information, and the second feature information includes second position information and second identification information. The processor 601 performs a step of comparing the first feature information with the second feature information to obtain a comparison result, the step including:
  comparing the first position information with the second position information to obtain a first comparison result; and
  comparing the first identification information with the second identification information to obtain a second comparison result.

The transceiver 602 performs a step of sending a response message to the electronic device according to the comparison result, the step including:
  sending the response message to the electronic device according to the first comparison result and the second comparison result.

In FIG. 6, a bus architecture may include any quantity of interconnected buses and bridges, and specifically connects together circuits that are of one or more processors represented by the processor 601 and of a memory represented by the memory 603. The bus architecture may further connect various other circuits for example, a peripheral device, a voltage stabilizer, and a power management circuit. These are known in the art, and therefore are not further described in this specification. The bus interface provides an interface. The transceiver 602 may be a plurality of components. To be specific, the transceiver includes a transmitter and a receiver, and provides a unit configured to communicate with various other apparatuses on a transmission medium. For different user equipment, the user interface 604 may also be an interface that can connect to a needed device externally or internally. The connected device may include, but is not limited to, a keypad, a display, a speaker, a microphone, a joystick, or the like.

The processor 601 is responsible for bus architecture management and general processing. The memory 603 may store data used by the processor when the processor 601 performs an operation.

It needs to be noted that, the server 600 in this embodiment may be the server in any implementation in the method embodiment in the embodiments of this application, and any implementation of the server in the method embodiment in the embodiments of this application may be implemented by the foregoing server 600 in this embodiment, and achieve the same beneficial effect. Details are not repeated herein again.

The embodiments of this application further provide a readable storage medium. The readable storage medium stores a program or an instruction. The program or instruction is executed by a processor to implement processes of the embodiments of the foregoing VoWiFi registration control method on the electronic device side or the server side, and the same technical effects can be achieved. To avoid repetition, details are not described herein again.

The processor is a processor in the electronic device or the server in the foregoing embodiments. The readable storage medium includes a computer-readable storage medium, for example, a computer Read-Only Memory (ROM), a Random Access Memory (RAM), a magnetic disk, or an optical disc.

The embodiments of this application further provide a chip, including a processor and a communication interface. The communication interface is coupled to the processor, and the processor is configured to run a program or an instruction to implement processes of the foregoing embodiments of the VoWiFi registration control method on the electronic device side or the server side, and the same technical effect can be achieved. To avoid repetition, details are not described herein again.

It should be noted that, the chip mentioned in the embodiments of this application may also be referred to as a system-level chip, a system chip, a chip system, a system on chip, or the like.

It needs to be noted that, terms "include," "comprise," and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by a sentence "including one" does not exclude that there are still other same elements in the process, method, object, or apparatus. Furthermore, it should be noted that a scope of the methods and apparatus in the implementations of this application is not limited to performing the functions in the order shown or discussed, but may also include performing the functions in a substantially simultaneous manner or in the reverse order depending on the functions involved. For example, the methods described may be performed in an order different from that described, and various steps may also be added, omitted, or combined. In addition, features described with reference to some examples may be combined in other examples.

A person of ordinary skill in the art may be aware that, in combination with the examples described in the embodiments disclosed in this specification, units and algorithm steps may be implemented by electronic hardware or a combination of computer software and electronic hardware. Whether the functions are executed by hardware or software depends on particular applications and design constraint conditions of the technical solutions. A person skilled in the art may use different methods to implement the described functions for each particular application, but it is not to be considered that the implementation goes beyond the scope of this disclosure.

Persons skilled in the art can understand that for convenience and conciseness of description, for specific working processes of the foregoing described system, apparatus and unit, reference may be made to the corresponding processes in the foregoing method embodiments, and details are not described herein again.

In the embodiments provided in this application, it is to be understood that the disclosed apparatus and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be indirect coupling or communication connection through some interfaces, apparatuses or units, and may be electrical, mechanical or in other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments hereof.

In addition, functional units in the embodiments of the present disclosure may be integrated into one processing unit, or each of the units may be physically separated, or two or more units may be integrated into one unit.

Through the descriptions of the foregoing implementations, a person skilled in the art may understand that the method according to the foregoing embodiments may be implemented through software and a necessary general hardware platform, and certainly, may also be implemented by hardware, but in many cases, the former manner is a better implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods according to the embodiments of this application.

It may be understood that the embodiments described in the embodiments of the present invention may be implemented by hardware, software, firmware, middleware, microcode, or a combination thereof. For hardware implementation, modules, units, and subunits may be implemented in one or more Application Specific Integrated Circuits (ASIC), a Digital Signal Processor (DSP), a DSP Device (DSPD), a Programmable Logic Device (PLD), a Field-Programmable Gate Array (FPGA), a general purpose processor, a controller, a micro-controller, a microprocessor, and other electronic units configured to execute the functions in the present disclosure, or a combination of the above.

For implementation by software, the technologies in the embodiments may be implemented by performing the functional modules (for example, a process and a function) in the embodiments of the present disclosure. Software code may be stored in a memory and executed by a processor. The memory may be implemented in the processor or outside the processor.

Although the embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

The invention claimed is:

1. A Voice over Wireless-Fidelity (VoWiFi) registration control method, performed by an electronic device, wherein the method comprises:
   obtaining first feature information of the electronic device; and
   controlling, when the first feature information does not match second feature information, termination of VoWiFi registration in a process of performing VoWiFi registration,
   wherein the first feature information comprises first position information determined based on a first position of the electronic device and first identification information, and
   the second feature information comprises second position information determined based on a second position of the electronic device and second identification information,
   wherein the controlling, when the first feature information does not match second feature information, termination of VoWiFi registration in a process of performing VoWiFi registration comprises:
   controlling termination of VoWiFi registration in response to an indication that the first position information does not match the second position information, or the first identification information does not match the second identification information.

2. The method according to claim 1, wherein the controlling, when the first feature information does not match second feature information, termination of VoWiFi registration comprises:
   sending the first feature information to a server; and
   receiving a response message sent by the server according to the first feature information,
   wherein the response message comprises the indication that the first position information does not match the second position information, or the first identification information does not match the second identification information.

3. The method according to claim 1, wherein the obtaining first feature information of the electronic device comprises:
   obtaining the current position of the electronic device and obtaining first feature information corresponding to the current position when the electronic device is in a data connecting state;
   or
   obtaining the current position of the electronic device and obtaining first feature information corresponding to the current position when the electronic device is not in a data connecting state, and the electronic device is in a preset condition.

4. The method according to claim 1, wherein the controlling, when the first feature information does not match second feature information, termination of VoWiFi registration comprises:
   comparing the first feature information with the second feature information; and
   controlling, when the first feature information does not match the second feature information, termination of VoWiFi registration.

5. A Voice over Wireless-Fidelity (VoWiFi) registration control method, performed by a server, wherein the method comprises:
   receiving first feature information sent by an electronic device;
   obtaining second feature information of the electronic device;
   comparing the first feature information with the second feature information to obtain a comparison result; and
   sending a response message to the electronic device according to the comparison result,
   wherein the first feature information comprises first position information determined based on a first position of the electronic device and first identification information, and
   the second feature information comprises second position feature information determined based on a second position of the electronic device and second identification information,
   wherein the comparing the first feature information with the second feature information to obtain a comparison result comprises:
   comparing the first position information with the second position information to obtain a first comparison result, and
   comparing the first identification information with the second identification information to obtain a second comparison result; and
   wherein the sending a response message to the electronic device according to the comparison result comprises:
   sending the response message to the electronic device according to the first comparison result and the second comparison result.

6. An electronic device, comprising:
   a memory storing computer-readable instructions; and
   a processor coupled to the memory and configured to execute the computer-readable instructions, wherein the computer-readable instructions, when executed by the processor, cause the processor to perform operations comprising:
   obtaining first feature information of the electronic device; and
   controlling, when the first feature information does not match second feature information, termination of Voice over Wireless-Fidelity (VoWiFi) registration in a process of performing VoWiFi registration,
   wherein the first feature information comprises first position information determined based on a first position of the electronic device and first identification information, and
   the second feature information comprises second position information determined based on a second position of the electronic device and second identification information,
   wherein the controlling, when the first feature information does not match second feature information, termination of VoWiFi registration in a process of performing VoWiFi registration comprises:
   controlling termination of VoWiFi registration in response to an indication that the first position information does not match the second position information, or the first identification information does not match the second identification information.

7. The electronic device according to claim 6, wherein the controlling, when the first feature information does not match second feature information, termination of VoWiFi registration comprises:
sending the first feature information to a server;
receiving a response message sent by the server according to the first feature information;
controlling, wherein the response message comprises the indication that the first position information does not match the second position information, or the first identification information does not match the second identification information.

8. The electronic device according to claim 6, wherein the obtaining first feature information of the electronic device comprises:
obtaining the current position of the electronic device and obtaining first feature information corresponding to the current position when the electronic device is in a data connecting state; or
obtaining the current position of the electronic device and obtaining first feature information corresponding to the current position when the electronic device is not in a data connecting state, and the electronic device is in a preset condition.

9. The electronic device according to claim 6, wherein the controlling, when the first feature information does not match second feature information, termination of VoWiFi registration comprises:
comparing the first feature information with the second feature information; and
controlling, when the first feature information does not match the second feature information, termination of VoWiFi registration.

* * * * *